May 21, 1968 E. S. KELSEY 3,384,810

TRANSFORMER CIRCUIT WITH DIRECT CURRENT FLUX CANCELLATION

Filed March 4, 1964 3 Sheets-Sheet 1

INVENTOR
Ernest S. KELSEY

Curphey & Erickson

AGENT

May 21, 1968 E. S. KELSEY 3,384,810

TRANSFORMER CIRCUIT WITH DIRECT CURRENT FLUX CANCELLATION

Filed March 4, 1964 3 Sheets-Sheet 2

INVENTOR
Ernest S. KELSEY
Curphey & Erickson
AGENT

INVENTOR
Ernest S. KELSEY
Curphey & Erickson
AGENT

United States Patent Office 3,384,810

Patented May 21, 1968

3,384,810

TRANSFORMER CIRCUIT WITH DIRECT CURRENT FLUX CANCELLATION

Ernest S. Kelsey, Ottawa, Ontario, Canada, assignor to Northern Electric Company Limited, Montreal, Quebec, Canada Filed Mar. 4, 1964, Ser. No. 349,384
5 Claims. (Cl. 323—48)

ABSTRACT OF THE DISCLOSURE

A transformer circuit from which direct current is supplied to a modulating means and thus which is expected to carry a direct current component and an alternating current component of an input signal. A direct current supply is also connected through a tertiary winding on the transformer; the primary winding and tertiary winding being wound in such direction and connected to the direct current supply, and input circuit, such that flux caused by the alternating current component of the input signal is aided, while flux caused by direct current in the transformer is substantially cancelled.

*Disclosure*

This invention relates to the neutralization of the direct current flux due to the direct current component of an input signal in a transformer.

It has long been realized that a large amount of direct current flux in a transformer tends to saturate the transformer core, thereby markedly reducing the impedance of the transformer windings. In a transformer carrying audio signals, for instance, this saturation effect can adversely affect the transfer of signal from the primary to secondary windings, as well as introduce distortion, and cause impedance mismatch between the circuits feeding the transformer and the circuits receiving the signal from the transformer.

There are many cases where the introduction of direct current through a winding of a transformer is unavoidable. For instance, it may be required that direct current must be passed through a transformer to feed an electronic tube, transistor, or telephone circuit. In the latter case, the transformer is often a repeating coil having each winding split into two balanced coils, with direct current being fed through a relay to the adjacent ends of a primary winding, and with the conductors of a telephone subscriber's loop circuit being fed to the opposite ends of the primary winding. Upon closing of the subscriber's loop when the subscriber releases his hookswitch, current is fed from the direct current source through the relay, through the coils of the transformer to the subscriber's transmitter. Because of the flow of current, the relay is caused to operate, giving an indication to supervisory circuits that the subscriber has lifted his receiver. By speaking into his transmitter, the subscriber modulates the current which is the signal subsequently passed through the transformer. This signal has a strong component of direct current which sets up a magnetic flux that biases the transformer toward saturation.

Consequently, in the past it has been necessary to provide a transformer with a larger core than would normally have been necessary had the direct current derived magnetic flux not been present. In this way, the biasing flux would be an insignificant amount of what is required to bias the transformer into saturation. However, this method requires an excessively large and heavy transformer. The core must be even larger if the transformer is to be standardized and is to be used in a variety of different circuits having various direct current requirements.

I have invented a circuit for a transformer which can provide complete neutralization of the direct current component of magnetic flux in the transformer. The transformer can therefore be designed to be much smaller in physical size and, indeed, miniaturized. In addition, it can be used in circuits with various amounts of direct current, since the amount of neutralization can be varied to suit the requirement.

To accomplish this I have provided a transformer comprising a primary, secondary, and tertiary winding, a source of direct current and a resistor, wherein an input circuit is connected to the primary winding, an output circuit is connected to the secondary winding, and the direct current source and resistor are connected to the tertiary winding in such manner that the magnetic flux set up in the transformer due to the direct current flowing from the direct current source through the tertiary winding substantially cancels the flux set up by the direct current component of the input signal from the input signal circuit in the primary winding.

A more detailed understanding of the invention may be had by referring to FIGS. 1, 2, 3, 4, and 5 of the drawings.

FIG. 2 shows the invention wherein the transformer comprises a repeating coil having balanced windings feeding a subscriber's loop, trunk circuit, or the like.

Figure 1:
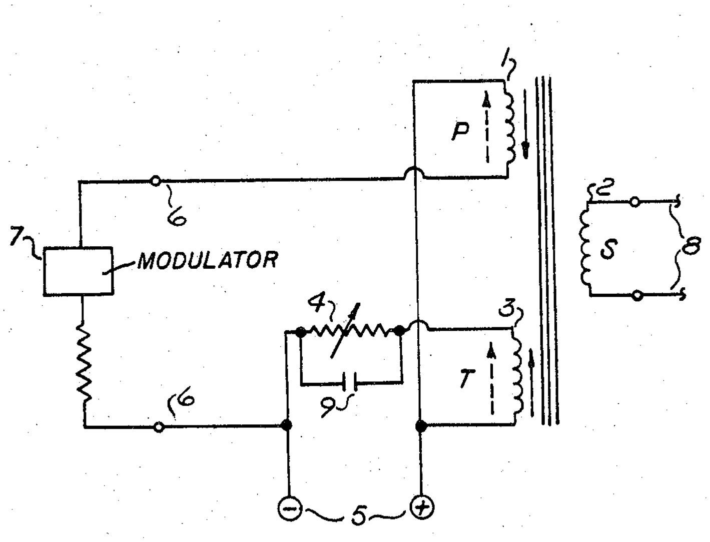
FIG. 1 shows a circuit for a transformer having

FIG. 1 shows a circuit for a transformer having primary coil 1, secondary coil 2 and tertiary coil 3 a resistor 4 (in this case shown as being variable) a source of direct current having positive and negative poles 5, an input circuit having conductors 6 and a modulator 7 which converts direct current flowing in the signal input circuit to a signal having alternating and direct components, and an output circuit having conductors 8. The primary and tertiary windings are connected so that direct current flowing from the positive pole (shown as +) of the direct current source flows in opposite directions in the primary and tertiary windings. This is shown by the solid arrows next to coils 1 and 3. The current flowing through the primary winding may be seen to flow via conductor 6 through the modulator 7 and back to the negative pole (marked −) of the direct current source. The direct current flowing through the tertiary winding 3 may be seen to be fixed by resistor 4 and returned to the negative pole of the direct current source. Should the transformer be placed in a circuit wherein the direct current drawn by the modulator is increased, resistor 4 may be made smaller causing a larger amount of current to flow through the tertiary winding 3 which would set up a larger magnetic flux to act in opposition to the one caused in the primary by the direct current component of the modulated signal.

It may be seen that the modulated signal, which consists of both alternating and direct components of current, is connected to the primary 1 and tertiary 3 windings in such manner that the alternating component of the modulated signal acts in the same direction in both coils, therefore, not cancelling. This is shown by the dotted arrows next to the primary and tertiary windings pointed in the same direction.

If it is required that the alternating signal voltage drop across resistor 4 cannot be tolerated, bypass capacitor 9 may be provided to short-circuit the alternating current around resistor 4 while forcing the direct current component through it. In addition, if it is desired that the tertiary winding should be relieved of all alternating signal components for circuit impedance matching reasons, capacitor 9 may be placed in parallel with the source of direct current which would effectively short circuit all alternating currents from the tertiary winding.

It is obvious that the signal modulator could be a carbon microphone, an electronic tube circuit, a light sensitive resistor, a transistor circuit, or other analogous devices.

Figure 2:
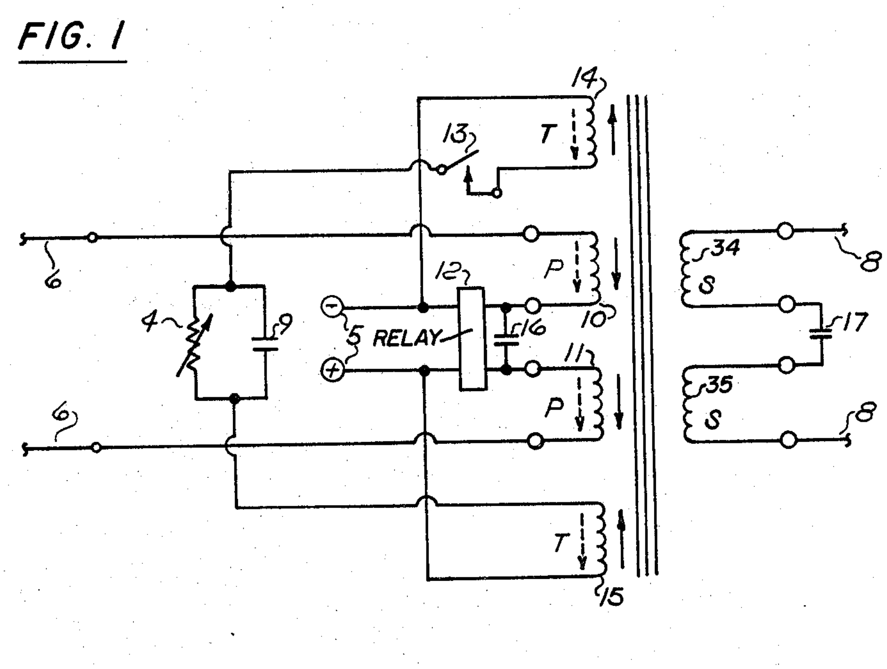

FIG. 2 shows the invention in a circuit utilizing a transformer, such as a repeating coil, having primary, secondary and tertiary windings split into balanced pairs. For instance, the primary winding consists of coils 10 and 11, the secondary winding consists of coils 34 and 35, and the tertiary winding consists of coils 14 and 15. It may be seen that the source of direct current is connected to the adjacent ends of the primary coils 10 and 11 and the signal input circuit containing the modulator is connected via conductors 6 to the opposite ends of the primary coils 10 and 11. A relay 12 is placed in the path of the conductors leading from the direct current source to the adjacent ends of the primary coils 10 and 11. Therefore, when the input circuit is closed, direct current is caused to pass through relay 12, operating, and giving an indication that the input circuit is closed, i.e., that the subscriber has lifted his hookswitch.

It may be seen that the direct current source is also connected to the opposite ends of the tertiary windings 14 and 15, and that the adjacent ends of these windings are connected together via resistor 4. A make contact 13 is, in this case, conveniently placed in series with the resistor so that when relay 12 is operated, contact 13 will close the circuit from the direct current source through the tertiary windings and the resistor. This is necessary because if the windings were connected with a short circuit where contact 13 appears, current would be drawn through the tertiary windings at all times, resulting in current waste while no input signal is present and direct current neutralization is not required.

Considering the solid arrows which show the direction of the magnetic flux set up by the direct current in the windings, the flux set up in the primary windings due to the current which is fed to the input circuit is seen to be in complementary directions in the two coils. The fluxes set up in the tertiary coils due to the current flowing through resistor 4 are also in complementary directions with each other, but in opposite and therefore cancelling direction to that set up in the primary windings. Therefore, it may be seen that by adjusting resistor 4 to the correct value, all flux in the transformer resulting from direct current flowing in the primary windings may be cancelled.

It may be seen, however, that the alternating component of the input signal must flow through the primary windings prior to entering the tertiary windings, and hence, because of the manner of connection of the windings, the flux set up by the alternating component of the input signal acts in the same direction in both the primary and tertiary windings. As in the case of the embodiment of FIG. 1, if it is desired to cause the alternating component to bypass the relay and tertiary windings bypass capacitor 16 may be connected between the adjacent ends of the primary coils 10 and 11.

In cases where the secondary winding is split into two coils, such as is shown in this embodiment, it is common practice to connect the output circuit via conductors 8 to the opposite ends of coils 34 and 35, and connect the adjacent ends together through a capacitor 17.

Figure 3:
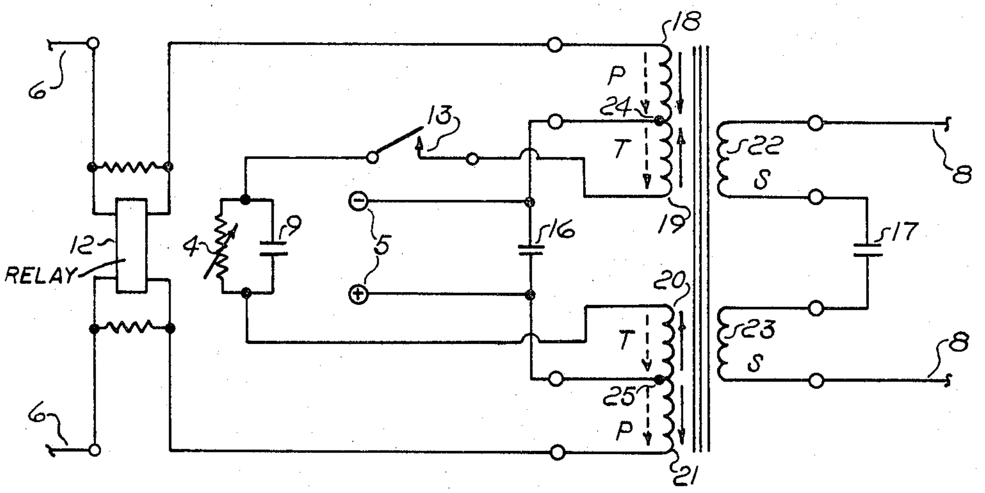
FIG. 3 shows the invention wherein the transformer comprises tapped balanced coils with the primary and tertiary windings being complementary parts of the coils.

The embodiment of the invention shown in FIG. 3 comprises a transformer having two tapped balanced coils as primary and tertiary windings, where a primary and tertiary winding are complementary portions of the tapped coils. Therefore, it may be seen that primary coil 18 and tertiary coil 19 are complementary and primary coil 21 and tertiary coil 20 are complementary. The secondary may be a single coil or split balanced coils as in the embodiment of FIG. 2. In FIG. 3, the secondary has been shown as coils 22 and 23.

The source of direct current at poles 5 is fed to the taps 24 and 25 of coils 18, 19, 20, and 21 and after flowing through primary coils 18 and 21 reaches the signal input circuit via conductors 6. The direct current also flows from taps 24 and 25 through tertiary coils 19 and 20 and resistor 4. Therefore, it may be seen that the magnetic fluxes set up by this direct current are opposite in direction in the primary and tertiary portions of the windings, and when the current in the tertiary winding is adjusted to the correct value by providing resistor 4 with the desired resistance, the magnetic flux in the transformer which is set up by the direct current flowing through the primary windings is cancelled. It may also be seen that the alternating component of the signal current arriving from the input circuit flows through the primary and tertiary windings in the same direction, causing no cancellation of magnetic flux.

A relay may conveniently be placed in series with the conductors leading from the signal input circuit to the opposite ends of the primary windings. In this case, relay 12 has been inserted having two balanced windings, and a make contact 13. The make contact 13 is provided for the same reason as in the embodiment of FIG. 2, that is, to cut off the flow of direct current through the tertiary winding when no input signal which operates relay 12 is present. Capacitors 9, 16, and 17 are also provided for the same purposes as in the embodiment of FIG. 2. The output circuit is connected via conductors 8 to the secondary coils.

Figure 4:
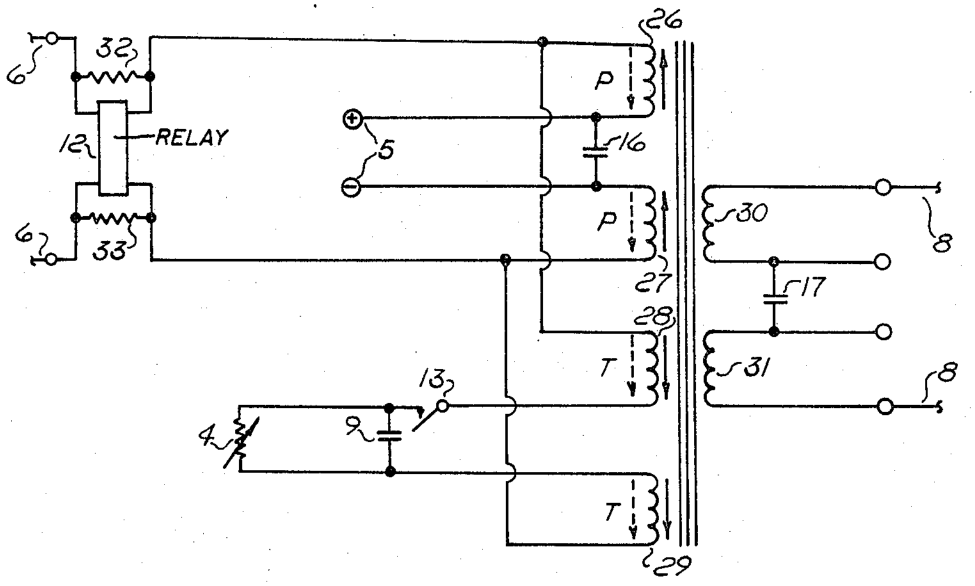
FIG. 4 shows the invention in the same circumstance as FIG. 2 but with a different connection between the transformer coils.

The embodiment of the invention shown in FIG. 4 has a similarity to that shown in FIG. 2 in that the transformer used contains split and balanced primary, secondary and tertiary coils. However, the connections between the coils in this case are different from that of FIG. 2. It may be seen that the source of direct current is fed to the adjacent ends of primary coils 26 and 27 and the signal input circuit is connected to the opposite ends of the primary coils. In this case, however, the tertiary coils 28 and 29 have their opposite ends connected to the opposite ends of the primary coils 26 and 27. The tertiary coils 28 and 29 have their adjacent ends connected together through resistor 4. Therefore, it may be seen that current from the source of direct current must flow through primary coils 26 and 27 before entering tertiary coils 28 and 29. However, the direction of direct current flow through the primary and tertiary windings is such that the magnetic fields set up by the primary windings is opposite to that set up by the tertiary winding, and since the amount of current flowing in the tertiary winding is controlled by resistor 4, enough flux is produced by the tertiary winding to completely cancel the magnetic field caused by the direct current flowing through the primary winding. At first, it may seem that if the resistor 4 is made small, the additional current flowing through the tertiary winding would set up an equal flux to that set up by the current flowing through the primary winding and thus the net increase would cancel itself. However, it must be realized that the number of turns in the tertiary winding is not necessarily equal to the number of turns in the primary winding, and the flux which is set up is determined by the number of ampere-turns in the respective winding. Therefore, it may be seen that provided the signal input circuit is drawing current, more current will flow in the primary winding than in the tertiary winding. Consequently, the number of turns in the tertiary winding must be greater than that in the primary winding, and at maximum flux cancellation, the number of ampere-turns in the tertiary and primary windings are equal. The connection of the primary and tertiary windings are such as to allow the alternating flux component of the input signal to be in the same direction.

It may be seen that the output circuit may be connected to the secondary coils 30 and 31 in a similar manner to the embodiment shown in FIG. 2 and FIG. 3 and that capacitors 9, 16 and 17 also play a similar roll.

In all the embodiments, the relay 12 may advantageously be connected with its windings between the signal input circuit and the transformer circuit, or between the direct current source and the transformer circuit. However, in the former case, non-inductive windings 32 and 33 should be used to allow the alternating component of the signal to bypass the inductive portions of the relay windings so as not to cause a signal drop. If the connection of the latter case is used in the embodiment of FIG. 3, the current drawn in the tertiary winding must not be sufficient to cause operation of the relay. Relay make contact 13 has been provided in the embodiment of FIG. 4 to arrest the flow of direct current in the tertiary windings while no input signal is present, as in all embodiments shown which use a relay.

Since there may be a direct current flowing in the secondary as well as the primary winding in all embodiments, the magnetic flux due to this current should also be cancelled. The relationship between the ampere-turns of the primary, secondary, and tertiary windings are as follows:

$$n_t I_t = n_p I_p \pm n_s I_s \quad (1)$$

wherein $n_p$, $n_s$ and $n_t$ are the number of turns in the primary, secondary, and tertiary windings respectively, and $I_p$, $I_s$ and $I_t$ are the direct currents flowing through the primary, secondary, and tertiary windings respectively. The choice of sign in Equation 1 depends on whether the directions of current in the signal input circuit and signal output circuit are such that their ampere-turn factors are aiding (+) or opposing (−) each other. Also, it is obvious that $$I_p = I_A + I_t \quad (2)$$

where $I_A$ is the direct current in the signal input circuit. Substituting Equation 2 in the Equation 1 gives $$(n_t - n_p) I_t = n_p I_A \pm n_s I_s \quad (3)$$

Now let $E_A$ be the signal input voltage, $R_A$ the resistance of the signal input circuit, and $R_N$ the neutralizing resistance consisting of resistor 4 plus the resistances of the primary and tertiary windings. Using Ohm's law, Equation 3 becomes $$\frac{(n_t - n_p) E_A}{R_N} = n_p I_A + n_s I_s \quad (4)$$

Dividing both sides by $n_p I_A$ and solving for $R_N$ gives:

$$R_N = \frac{(n_t/n_p - 1) R_A}{1 + (n_s/n_p)(I_s/I_A)} \quad (5)$$

In the case where $I_s = 0$, this reduces to:

$$R_N = (n_z/n_p - 1) R_A \quad (6)$$

With the circuit arranged so that all the current in the primary equals the current in the signal input circuit, $I_p = I_A$, and $$R_N = \frac{(n_t/n_p) R_A}{(1 + n_s/n_p)(I_s/I_p)} \quad (7)$$

and if $I_s = 0$:

$$R_N = (n_t/n_p) R_A \quad (8)$$

This shows that the resistor 4 designated as $R_N$, should be equal to the ratio of the tertiary to primary turns times the signal input circuits internal resistance for maximum neutralization of direct current flux.

If $z_p$ and $z_t$ are the self impedances of the primary and tertiary windings and $z_m$ their mutual impedance, their joint impedance $z_{pa}$ when connected in the parallel aiding connection will be $$z_{pa} = \frac{z_p z_t - z_m^2}{z_p + z_t - 2z_m} \quad (9)$$

Using this equation, a formula for $z_{pa}$ in terms of two useful design parameters can be obtained. These design parameters are the coefficient of coupling "$k$," where $$k = z_m / \sqrt{z_p z_t} \quad (10)$$

and the transmission ratio "$n$" of the number of turns in the primary winding to the number of turns in the tertiary winding. This ratio is approximately equal to the square root of the impedance ratio, that is:

$$n = \sqrt{z_p / z_t} \quad (11)$$

In terms of "$k$" and "$n$"

$$z_{pa} = z_p \left( \frac{1 - k^2}{n^2 + 1 - 2kn} \right) \quad (12)$$

The effect of connecting the supplementary tertiary winding in parallel with the primary winding is to change the input impedance of the repeating coil, with the secondary winding open, from $z_p$ to $z_{pa}$: The factor by which $z_p$ must be multiplied to obtain $z_{pa}$ will be designated "$f$." Evidently:

$$f = \left( \frac{1 - k^2}{n^2 + 1 - 2kn} \right) \quad (13)$$

This factor will, in general, be less than one as can readily be seen by adding and subtracting $k^2$ to the denominator of (12) giving $$f = \frac{1 - k^2}{(n - k)^2 + (1 - k^2)} \quad (14)$$

Evidently $f$ is less than one unless $n = k$. In this special case $f = 1$. Considering "$n$" as the independent variable, "$k$" as the dependent variable and "$f$" a constant, Equation 12 can be written $$k^2 - 2fnk + f(n^2 + 1) - 1 = 0 \quad (15)$$

Solving for $k$:

$$k = fn \pm 1 - \left( \frac{1 - f}{f} \right) (fn)^2 \quad (16)$$

Figure 5:
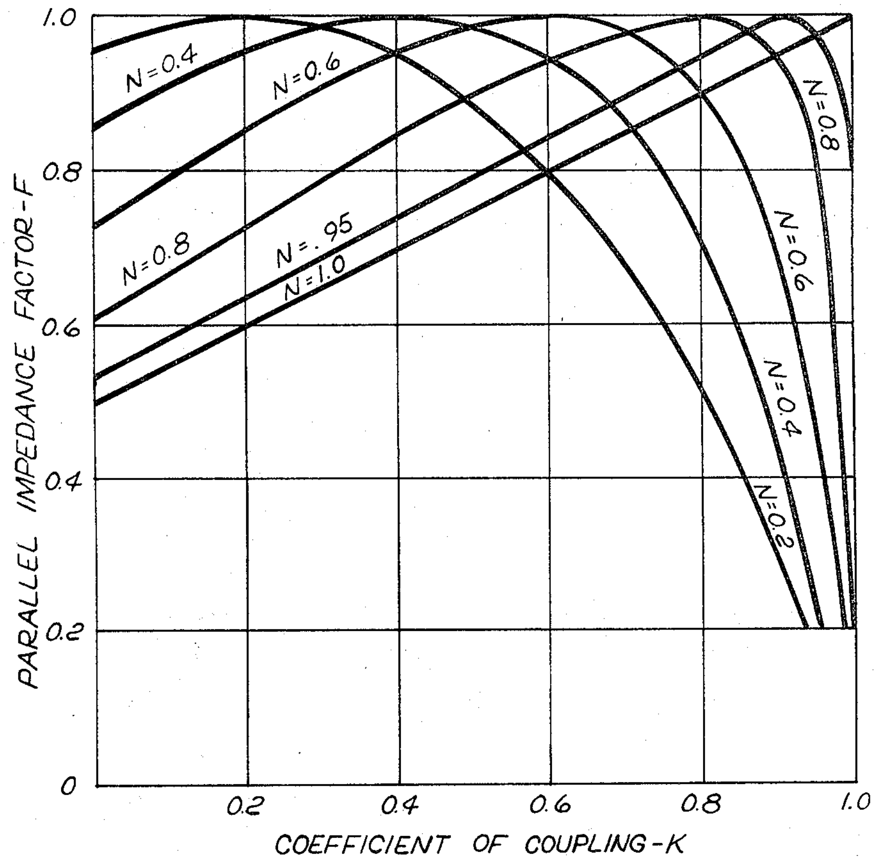
FIG. 5 shows the relationship between the coefficient of coupling, the equivalent parallel impedance of the primary and tertiary windings, and turns ratio therebetween.

In FIG. 5 curves are plotted giving "$f$" as a function of "$k$" for various values of the parameter "$n$." This permits values of "$f$" and "$n$" to be selected that will give practicable values for the coefficient of coupling "$k$." Conversely, by selecting a suitable value for "$k$," the turns ratio necessary for any desired value of "$f$" can be ascertained.

In the case where it is desired that the tertiary winding should have little or no effect upon the impedance facing the signal input circuit, the preferred value for "$f$" is one, and FIG. 5 shows that this will be the case when "$n$" is equal to "$k$." It may also be seen that the factor "$k$" should not be too close to unity as small variations of "$n$" or "$k$" from the design objective will cause large departures of "$f$" from the design value.

It will be obvious to those understanding my invention that it may be used wherever the problem of saturation of the core in an inductor exists: for instance, for telephone set induction coils, inductors used in various types of filters including rectifier filters, etc. In fact, these and other inductive elements which utilize my invention may, with the use of a miniaturized highly permeable core, be much reduced in size and benefit from the advantages accrued therefrom.

What is claimed is:

1. A circuit for a transformer with neutralization of direct current flux comprising:

(a) a transformer comprising a primary, secondary and tertiary winding,
(b) a source of direct current,
(c) a resistor,
(d) an alternating current input circuit comprising a pair of conductors, and an output circuit connected to the secondary winding,
(e) a first bypass capacitor connected in parallel with the resistor,
(f) one end of each of the primary and tertiary windings being connected to the one pole of said direct current source, the other end of the tertiary winding being connected to one end of the resistor, the other end of the resistor and the other end of the primary winding being connected to different respective conductors of the signal input circuit, said other end of the resistor also being connected to the other pole of the source of direct current,
(g) the direction of winding of the primary and tertiary windings being such that flux of the transformer caused by the alternating current component of an input signal is substantially aided, while flux in the transformer caused by direct current is substantially cancelled, and whereby an alternating current output signal may be obtained from the secondary winding.

2. A circuit for a transformer with neutralization of direct current flux comprising:

(a) a transformer comprising a primary, secondary, and tertiary winding,
(b) a source of direct current,
(c) a resistor,
(d) an alternating current input circuit comprising a pair of conductors, and an output circuit connected to the secondary winding,
(e) the primary and tertiary windings each comprising two balanced coils; wherein one end of each of the primary coils are connected to different conductors of the input circuit respectively, and the other ends of the primary coils are respectively connected to the positive and negative poles of the source of direct current, one end of each of the tertiary coils are respectively connected to the positive and negative poles of the direct current source, and the other ends of the tertiary coils are connected together through the resistor,
(f) the direction of winding of the primary and tertiary windings being such that flux of the transformer caused by the alternating current component of an input signal is substantially aided, while flux in the transformer caused by direct current is substantially cancelled, and whereby an alternating current output signal may be obtained from the secondary winding.

3. A circuit as defined in claim 2 having a first bypass capacitor connected in parallel with the resistor, and a relay with two balanced windings, one of said windings being connected between one of said other ends of said primary coils and a pole of the direct current source, and the other one of said windings being connected between the other one of said other ends of said primary coils and the other pole of the direct current source, a make contact of the relay connected between one of said other ends of one of the tertiary windings and the resistor, and a second bypass capacitor being connected between said other ends of the primary coils.

4. A circuit for a transformer with neutralization of direct current flux comprising:

(a) a transformer comprising a primary, secondary, and tertiary winding,
(b) a source of direct current,
(c) a resistor,
(d) an alternating current input circuit comprising a pair of conductors, and an output circuit connected to the secondary winding,
(e) the primary and tertiary windings comprising complementary portions of two tapped coils, wherein the positive and negative poles of the direct current source are connected respectively to the taps of said coils, the other ends of said tertiary windings are connected together through the resistor, and the other ends of the primary windings are connected respectively to the conductors to the input circuit,
(f) the direction of winding of the primary and tertiary windings being such that flux of the transformer caused by the alternating current component of an input signal is substantially aided, while flux in the transformer caused by direct current is substantially cancelled, and whereby an alternating current output signal may be obtained from the secondary winding.

5. A circuit as defined in claim 4 having a first bypass capacitor connected in parallel with the resistor, a second bypass capacitor connected between the taps of said windings and having a relay with two balanced windings, one of the balanced windings being connected between a conductor of the input circuit and one of the opposite ends of the primary coils, and the other one of the balanced windings being connected between the other conductor to the input circuit and the other one of the opposite ends of the primary coils, and a make contact of said relay connected between the adjacent end of one of the tertiary coils and the resistor.

References Cited

UNITED STATES PATENTS

| | | | |
|---|---|---|---|
| 2,207,392 | 7/1940 | Zuschlag | 317—157.5 |
| 3,078,396 | 2/1963 | Engelsted | 323—89 X |
| 3,136,948 | 6/1964 | Windsor | 323—89 X |
| 3,142,011 | 7/1964 | Shieh | 323—89 X |
| 3,221,244 | 11/1965 | Biringer | 323—56 X |
| 3,229,184 | 1/1966 | Churchill | 323—45 X |

LEE T. HIX, *Primary Examiner.*

A. D. PELLINEN, *Assistant Examiner.*